United States Patent [19]
Decker et al.

[11] 4,072,316
[45] Feb. 7, 1978

[54] THREE-PIECE HEAT RESISTANT GASKET

[75] Inventors: John W. Decker, Stockbridge; Myron W. Tubbs, Royal Oak, both of Mich.

[73] Assignee: Eagle-Picher Industries, Inc., Cincinnati, Ohio

[21] Appl. No.: 745,094

[22] Filed: Nov. 26, 1976

[51] Int. Cl.² ............................................. F16J 15/12
[52] U.S. Cl. ................................. 277/235 B; 277/166
[58] Field of Search ................. 277/22, 166, 235 B, 277/180

[56] References Cited
U.S. PATENT DOCUMENTS

| 2,089,254 | 8/1937 | Fitzgerald | 277/235 B |
| 3,595,589 | 7/1971 | Henderson | 277/235 B |
| 3,863,936 | 2/1975 | Farnam et al. | 277/235 B |
| 3,939,892 | 2/1976 | Farnam et al. | 277/166 |

Primary Examiner—Robert I. Smith
Attorney, Agent, or Firm—Wood, Herron & Evans

[57] ABSTRACT

A three-piece heat resistant gasket having a rigid body molded of heat insulating material forming a relatively thin web around the fluid passage to be sealed. Two resiliently compressible gasket elements in the form of flat slabs of heat insulating materials are secured to the opposite faces of the web around the fluid passage, with their outer faces lying slightly above bolt hole-containing bosses, formed as part of the body, which limit the compression of the gasket elements. The provision of a large number of small cavities in the web, which are closed by the gasket elements, significantly reduces the rate of heat transfer through the gasket.

12 Claims, 5 Drawing Figures

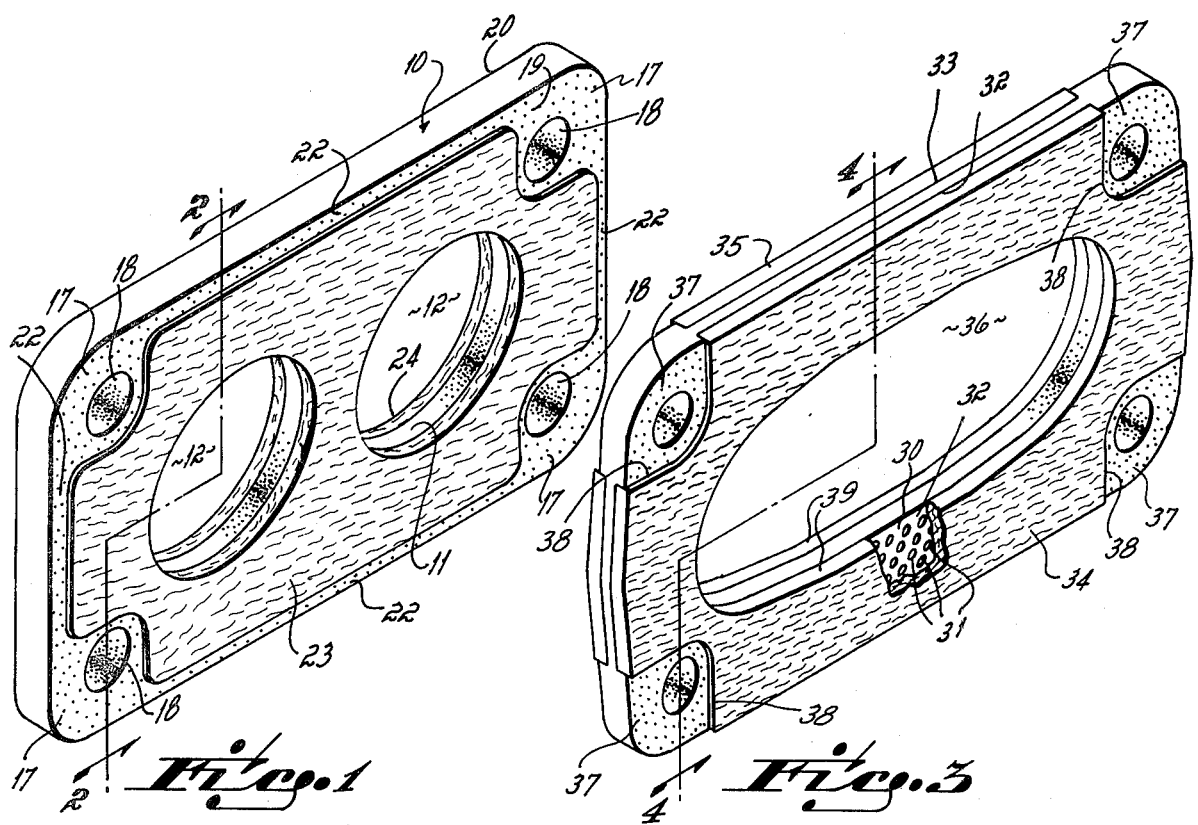

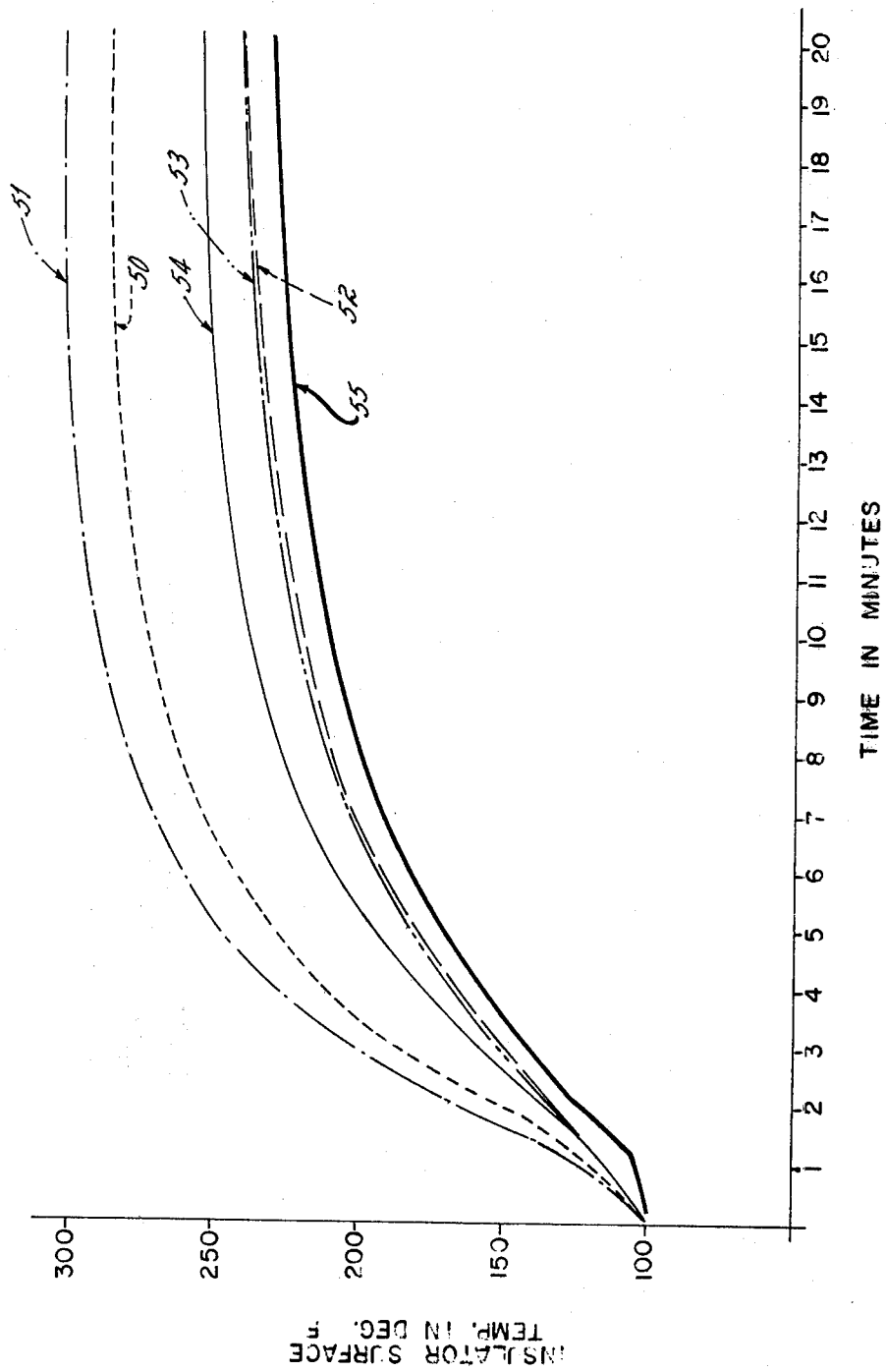

THREE-PIECE HEAT RESISTANT GASKET

FIELD OF THE INVENTION

This invention relates to a construction for heat resistant gaskets by which insulating characteristics are improved. The improvement is particularly useful in (but is not limited to) gaskets of the type which are used to seal the fluid passage between an automobile manifold and carburetor, to better heat insulate the carburetor from the hot manifold.

BACKGROUND OF THE INVENTION

An automotive carburetor gasket seals a fluid passage between the relatively hot manifold and the relatively cool carburetor. In compliance with recent governmental regulations, automobiles are now being designed to operate at hotter manifold temperatures; and this requires improved insulation of the carburetor in order to reduce fuel bowl temperatures. Although prior manifold-carburetor gaskets provide the necessary sealing, they do not provide the desired heat insulation, and they display poor durability at the high temperatures now being encountered. It is expected that over the next several years the required heat insulating capabilities of carburetor gaskets will become increasingly more stringent.

In U.S. Pat. No. 3,986,721, which is commonly owned with this application, there is disclosed a carburetor gasket wherein the sealing function is provided by a single compressible gasket element which is cut from a sheet or slab of fibrous insulating material such as asbestosboard, vegetable fiberboard, cork composite, or the like. The fluid passage through which the gasoline-vapor air mixture flows from the manifold to the carburetor is encircled by this element. The compressible element is in turn surrounded by and bonded to a rigid (incompressible) rim of phenolic resin or the like. The rim has a thickness slightly less than the thickness of the compressible gasket element so that the latter stands proud of the rim by the amount by which the gasket is to be compressed in mounting, the rim thus functioning as a compression limiting stop to prevent over-compression of the gasket. Bolt holes formed at least partly in the rim are provided for mounting the gasket between the manifold and the carburetor flange.

Gaskets of that type have effectively met previous heat insulation requirements for automotive use. However, in order to meet current and expected future requirements, the need exists for a gasket having improved (i.e., lower) heat transfer characteristics. Moreover, if gaskets of the type shown in patent No. 3,986,721, previously identified, are to be used at high temperature conditions, a compromise as to choice of gasket materials is inevitably necessary. Cellulose (vegetable) type fiberboard has good heat transfer characteristics (it transfers heat at a relatively low rate), and this favors its selection as the material for the compressible element. However, it is relatively poor in its resistance to degradation at high service temperatures (above about 250°–275° F.), which tends to shorten its life in installations where use temperatures are high. On the other hand, asbestosboard offers very good heat resistant qualities, i.e., it can withstand exposure to higher temperatures for longer times than the cellulosic board, but its heat transfer rate is not as low. Thus, the choice of either carries some disadvantages, along with its advantages.

SUMMARY OF THE INVENTION

It has now been found that markedly improved results in terms of reduced heat transfer rate, better resistance to degradation at high temperature, and lower cost, can be provided by a three-piece gasket construction having a molded (non-porous), heat insulating rigid body with a recessed, relatively thin central web portion that presents two oppositely facing planar parallel faces and which surrounds the fluid passage. Adjacent the corners of the web, a plurality of bolt-hole-presenting bosses project outwardly from both faces thereof. Separate compressible heat insulating gasket elements are secured to the respective opposite planar faces of the recessed web portion. They have fluid passage openings which are congruent with that of the web with which they are aligned by the bosses. A large plurality of small cavities or air pockets are preferably molded into at least one of the faces of the web portion and are closed by the compressible gasket element which is secured over that face, so as to form dead air spaces. The provision of such cavities surprisingly reduces the rate of heat transmission through the three-part gasket; it also reduces weight and, because less material is used, it reduces cost.

A further advantage of this three part construction with the recessed web is that, even without the provision of cavities in the web, it becomes possible to provide gaskets of a relatively great specified thickness (e.g., ½ inch or greater), even though the compressible gasket material itself is not available in such great thicknesses.

Further, the fact that two separate compressible elements are involved enables different materials to be used on the opposite faces, thereby to achieve better overall results. More particularly, a material such as cellulosic fiberboard, with its relatively good heat insulating characteristics but its relatively poor ability to withstand degradation by continued exposure to high temperatures, can be used on the side of the web which in use will be adjacent to the (cooler) carburetor, whereas on the other side of the web, facing the (hotter) manifold, a material such as asbestosboard, which is better able to withstand degradation at high temperature, can be used even though it does not have such good heat transfer characteristics as the cellulosic material. In this manner, the characteristics of both materials are combined in best advantage.

THE PRIOR ART

Gordon U.S. Pat. No. 3,944,235 shows a heat insulating gasket comprising a thick core of heat insulating material, such as phenolic resin, which is sandwiched between two thin cutout "skin sheets" of resilient gasket material, such as a nitrile rubber and asbestos composition. The thick core provides most of the heat insulating capability, while the thin facings of gasket material provide the resilience needed to assure sealing. The skin sheets are adhesively secured to the core.

Farnam et al U.S. Pat. No. 3,655,210 shows a three-piece gasket construction with a core of semi-porous asbestos millboard which is impregnated with a water-alcohol, phenolic resin, mix. A washer-like member is interposed between two die cut pieces of the core material in molding, to provide increased densification, rigidity and thickness in the area of the bolt holes. The core is flanked on its outer sides with thin skin sheets of mineral fiber and cured nitrile rubber, through which bolt hole bosses project.

Seligman U.S. Pat. No. 2,191,044 shows a liquid seal (not a heat insulating gasket) with an outwardly shouldered body portion that has a tongue or flange projecting radially inwardly toward the center. The body is made of metal, and the inwardly extending flange holds a rubber sealing element which is wrapped over the inside edge of the flange from one face thereof to the other. Moyers U.S. Pat. No. 3,195,906 shows a generally similar construction but with a body of plastic.

Carrell U.S. Pat. No. 3,158,380 shows a joint seal wherein annular rings of gasket material are received in grooves on opposite sides of a body, and wherein the body is partially split in its central plane to provide an outward spring action that presses the gasket strips against the surfaces to be sealed.

Daubenberger U.S. Pat. No. 3,462,161 shows a gasket with a rigid body having an intermediately positioned annular groove and a resilient but imcompressible hat-shaped ring seated in the groove on each face of the body.

Insofar as is known, none of the prior art shows a thermal insulating gasket having a rigid molded web portion with dead air spaces formed in it, and with flat slab-like gasket elements which are both resiliently compressible and insulating affixed to the opposite faces of the web.

DESCRIPTION OF THE DRAWINGS

The invention can best be further described by reference to the following detailed description and the drawings in which:

FIG. 1 is a perspective view of a two-port gasket in accordance with one embodiment of the invention;

FIG. 2 is a cross-section taken on line 2—2 of FIG. 1;

FIG. 3 is a perspective view, partly broken away, of a single port gasket in accordance with a modified embodiment of the invention, and having a web with air pockets molded into it;

FIG. 4 is a cross-section taken on line 4—4 of FIG. 3, and

FIG. 5 is a diagrammatic illustration in chart form showing the heat transfer characteristics of various types of gaskets as a function of time.

DESCRIPTION OF THE PREFERRED EMBODIMENTS

The gasket shown in FIGS. 1 and 2, in accordance with one embodiment of the invention, has a molded rigid body generally at 10 which includes a recessed, relatively thin, central web portion 11 presenting two planar, parallel faces designated at 13 and 14. Fluid passages 12, 12 (the number of passages is of no significance) are formed through the web.

Rigid body 10 also includes several bolt hole bosses as designated at 17, four in the embodiment shown, each of which presents an aperture or bolt hole through it as at 18. As can best be seen in the lower portion of FIG. 2, each boss 17 projects outwardly from the opposed faces 13 and 14 of the web portion. On each face the bosses are of the same height above the face, so that their bearing surfaces 19 and 20 are respectively coplanar with one another.

The rigid body 10 is molded, as by injection molding, from a moldable non-porous heat insulating material. The nature of the material of which rigid body 10 is made is not critical and does not form the invention, but the material should be one which can be molded, is rigid (i.e., substantially less compressible than the gasket elements so as to limit compression of the latter in service) and which has heat insulative characteristics. By way of example, suitable materials include phenolic resins, nylon, ABS, acrylics, urea-formaldehyde resins, and polyester resins. The material may be asbestos or fiberglass filled.

In the embodiment shown in FIGS. 1 and 2, the bolt hole bosses 17 are positioned at four corners of body 10, and they are connected by a ridge or rim 22 which runs between them. The rim surface lies in the same plane as the respective bearing face 19 or 20 of the bosses, so as to define the same compression limit as the bosses. The bosses and the rim, if a rim is present, establish a recess, well or seat on each face of the body. Compressible gasket elements 23 and 24 are seated in this well and facially engage the web faces 13 and 14. As seen in FIG. 1, each gasket element 23 and 24 is configured to fit within the recess bounded by the bolt hole bosses 17 and rim 22. Each is a planar, relatively thick piece or slab which is both resiliently compressible and heat insulating as well. By way of example, suitable examples of such materials are rubber and rubber-like materials, compressible asbestosboard, fiberboard materials, cork composites and the like. It can be seen that each gasket element is configured to be seated snugly within the recess and that each has fluid openings through it which are substantially congruent with the fluid passages 12, 12 in the body.

The gasket elements are adhesively secured to web faces 13 and 14. A preferred adhesive for securing materials of the types mentioned is "Permafuse 3A" adhesive made by Permafuse Corp., 675 Main Street, Westbury, N.Y., which is a phenolic resin adhesive containing 3% nitrile rubber. The material takes a permanent set under 100 psi pressure at 325° F. for 10 minutes. It should however be understood that the function of the adhesive is merely to hold the gasket elements to the web, pending installation; when installed between a carburetor and manifold, the elements are retained in position, even if the adhesive should fail. As discussed below, a pressure sensitive adhesive may be used to facilitate replacement of a gasket element.

As will be seen from the following description, the web is realtively thin in comparison to prior constructions, and the individual gasket elements are relatively thick. By way of specific illustration but not limitation, in one form of automotive gasket the web portion has a thickness of 0.130 inch, and the dimension between the bearing faces 19 and 20 of the bosses 17 is 0.250 inch, so that the faces 19 and 20 each stand 0.060 inch above the respective faces of the web portion. Each gasket element is about 0.70 inch thick, so that its outside face lies in a plane about 0.010 inch above the respective face 19 or 20 of the bosses and the rim. This 0.010 inch distance is the amount by which the element is compressed in mounting, the bosses (and rims, if present) of rigid body member 10 preventing further compression.

In the embodiment shown both gasket elements 23 and 24 are usually, but need not necessarily be, of the same thickness. For maximum efficiency and serviceability the two gasket elements 23 and 24 can be made of different materials, to utilize the best characteristics of each. A cellulose fiberboard such as that sold by Colonial Fiber Company of Manchester, Conn., under their designation S-560, is especially suitable as the material for the cooler side of the gasket, i.e., the side which in use will be mounted adjacent to the carburetor, because it possesses excellent heat insulative characteristics, although it is relatively poor in its ability to withstand degradation at temperatures above about 250°–275° F. An asbestos material, such as that sold by Colonial Fiber under the designation "S-601 Hi-Temp" is especially suitable for the gasket element on the hotter side of the gasket, adjacent to the manifold, because it can withstand temperatures up to about 500° F, in use, although its heat insulating characteristics are not so good as those of the cellulose fiberboard. The asbestosboard will withstand the high temperatures from the manifold; and the cellulosic element on the other side provides better insulating characteristics, and although it does not possess the higher temperature resistance of the asbestos, that it not required because the asbestos and the web insulate it from high temperatures. Where the requirements are not so stringent, the same material can of course be used on each side.

When a carburetor is removed for servicing it sometimes happens that one or both compressible elements will be damaged in the processes of removal, so as no longer to be serviceable. By the use of a pressure sensitive adhesive to adhere the gasket elements to the web, the invention lends itself to removal of one or both of the gasket elements and replacement. This is an advantage over configurations wherein the gasket element is integrally bonded to the body, as in U.S. Pat. No. 3,986,721. Suitable examples of adhesives suitable for this are acrylic type pressure-sensitive adhesives, such as that sold by National Starch Company, Chicago, Illinois as their No. 801049, and SBR type pressure-sensitive adhesives, such as that sold by Hughes Glue Company, Detroit, Michigan under their designation HC-4691. These materials are supplied as liquids and are applied by coating onto the sheet gasket stock. A release paper is then applied. The gasket stock is then cut or punched to the appropriate configuration for the particular gasket. The release paper is then removed and the gasket pressed into place on the web. If it is necessary to replace a gasket element, it can easily enough be stripped from the web and a new one pressed into place.

Referring again to the two-component gasket shown in previously identified U.S. Pat. No. 3,986,721, one advantage of the present construction is that it facilitates the manufacture of gaskets with a relatively large thickness dimension between the two bearing surfaces 19 and 20. In some cases, automotive parts specifications call for this dimension to be of the order of ½ inch or more. If a two-piece gasket construction were to be used, as shown in said patent, a correspondingly thick piece of gasket material would be required. In some cases it is difficult to obtain the desired sheet material in such great thicknesses; or the thicknesses which are commercially available may not correspond to the desired dimension. With the three-piece construction of this invention, the web itself occupies part of the thickness dimension, and this enables thinner gasket pieces to be used and the web to be dimensioned to provide any desired overall thickness, regardless of the particular thickness of gasket material which happens to be available commercially. In this connection, it should be noted that the two gasket elements may have different thicknesses, and the bosses project different heights on opposite sides of the web.

FIGS. 3 and 4 show a modified embodiment which provides significantly better heat transfer characteristics than that of FIGS. 1 and 2. In this embodiment, the web portion of the rigid body, indicated at 30, is provided with a large number of small cavities 31, in the form of right cylindrical holes. These cavities 31 are conveniently formed in molding and can extend entirely through the web between the two faces 32 and 33.

It has been found that although the holes eliminate some of the insulating web material, they substantially reduce the rate of heat transmission through the gasket. Such reduction of heat transfer is shown graphically in FIG. 5, discussed below. These apertures can be formed in the web in any convenient manner, for example by drilling, burning reaction, etc., but it is most convenient that they be formed in the molding process by which the rigid body itself is formed. The gasket elements 34 and 35 on either side of the web, which can be similar to the gasket elements 23 and 24 described previously, close and seal the open ends of the cavities 31. The cavities do not communicate with each other or with the fluid passage (in this embodiment a single fluid passage 36 is shown); nor do they open to the outside faces of the gasket.

The spacing of the small openings 31 is not critical; however, it can be said that the smaller the openings and the greater their number, the lower the rate of heat transmission. It has been found most effective to use cavities which are right cylinders about 0.030 to 0.125 inch in diameter, spaced approximately 0.090 to 0.375 inch on center. A roughly rectangular gasket similar to that shown, having external dimensions of about 2-½ inches × 4 inches, may suitably contain about 30 to 120 such holes.

The embodiment of FIGS. 3 and 4 further differs from that of FIGS. 1 and 2 in that its bolt hol-presenting bosses 37 are isolated; there is no interconnecting rim between them corresponding to the rim 22. The gasket components 34 and 35 have external dimensions congruent with those of the rigid body itself and are notched as at 38 at their corners, to abut the bosses. The bosses position the gasket elements so that the ports 39 in the gasket elements will coincide with the port 36 in the core itself.

Comparative heat transfer characteristics of the invention in comparison with the prior art is shown in FIG. 5, which is a graphical representation of the time variation of the temperature on the upper surfaces of various gaskets, the opposite surfaces of which were resting on a hot plate at a temperature of 335° F. The various curves illustrate different types of gaskets, all having the same configuration and all conforming to the same specification (Chrysler MS-GZ20) for a particular automotive gasket installation.

The curve designated by 50 shows the gasket cool surface temperature (°F) variation with time (in minutes), for a gasket made in accordance with U.S. Pat. No. 3,944,235, previously discussed. Curve 51 shows the curve for a similar gasket from which the two skin sheets have been removed. By comparison of curves 50 and 51, it can be seen, as expected, that the gasket functions better with the skin sheets than without, because the skin sheets add some slight thickness.

Curve 52 represents the time/temperature relation for a gasket made in accordance with previously identified U.S. Pat. No. 3,986,721, and having a gasket element comprising an asbestosboard which is 85% asbestos fiber/15% cellulose fiber and binder content. It can be seen that such a two-component gasket provides significantly lower temperatures for a given time of exposure, than that of curves 50 and 51. Curve 53 shows the insulating characteristics for a gasket of the same type, but with a 100% asbestosboard as the gasket material.

Curve 54 shows the characteristics of a gasket of the type shown in FIGS. 1 and 2 of this application, with both gasket elements of asbestosboard material. It can be seen that this gasket is significantly better than that of curves 50 and 51 although not so good as that of curves 52 and 53. This is because the phenolic material used in the rigid web is not as good an insulator as the fibrous heat insulating material used for the gaskets of curves 52 and 53, and to the extent that it constitutes a part of the overall thickness of the gasket, it reduces the insulating qualities of the gasket elements. However, that is offset by the fact that the present gasket is significantly less expensive, since it uses less of the expensive fiberboard material, and by the fact that longer service can be obtained by use of different materials on opposite sides, as previously discussed.

Curve 55 shows the low rate of heat transfer characteristics of a gasket of the type shown in FIGS. 3 and 4, which has a large plurality of cavities in the web. This gasket provides the lowest cool surface temperatures of the group. Moreover, it requires a smaller volume of the comparatively expensive gasket materials (since the web reduces their thickness) and less of the rigid core material itself by reason of the volume of voids in the web portion. That these advantages can be accomplished by removal of core material and by use of thinner gasket materials, is a surprising and highly beneficial result.

Having described the invention, what is claimed is:

1. A heat resistant gasket comprising,
    a one-piece rigid heat insulating body of molded resin and having
        a web portion presenting two oppositely facing planar parallel faces, the web portion surrounding at least one fluid passage which extends through it from one said face to the other, and
        a plurality of bolt hole-presenting bosses integral with said web portion and projecting outwardly from said faces,
    a two compressible gaskets elements, each a flat slab formed from a resilient gasket material which is heat insulative, said elements being adhesively secured to the respective planar faces of the web portion of said rigid body,
    said bosses by their outward projection from said faces establishing seats on said web portion on which they position said gasket elements,
    each said gasket element abutting the bosses which thereby locate the gasket element on its seat with respect to said passage,
    each said gasket element having an opening through it which is substantially congruent with the fluid passage in said rigid body,
    the combined thickness of the web portion and the two gasket elements secured thereon being greater than the thickness of the body at the bosses.

2. The gasket of claim 1 wherein a large plurality of small cavities are formed in at least one of said faces of said web portion, said cavities opening to said face but closed by the compressible gasket element secured on said face and thereby constituting dead air spaces, the said cavities reducing the rate of heat transmission through said gasket in comparison to that of a similar gasket without such cavities.

3. The gasket of claim 2 wherein said cavities are through passages that extend through said web portion from one of said faces to the other, parallel to said fluid passage but not connecting with it.

4. The gasket of claim 3 wherein said cavities are in the form of right cylinders having diameters in the approximate range of 0.030 inch to 0.125 inch.

5. The gasket of claim 4 wherein the said cavities are positioned outwardly of said fluid passage and inwardly of said bosses.

6. The gasket of claim 1 wherein said body is a molded phenolic resin and said gasket elements are of fiberboard.

7. The gasket of claim 1 wherein said body includes a rim around said gasket elements, said rim running between said bosses.

8. The gasket of claim 7 wherein said rim is of the same thickness as the bosses between which it runs.

9. The gasket of claim 1 wherein the two gasket elements are formed of two different gasket materials having different heat insulating characteristics, one material having better insulating characteristics than the other, and the other displaying better resistance to degradation at high service temperatures,
    said one material secured to one face of said web portion for positioning proximate to an automobile carburetor, said other material affixed to an opposite face of said web porting for positioning proximate to an automobile manifold.

10. The gasket of claim 9 wherein said one material is a cellulosic fiberboard.

11. The gasket of claim 9 wherein said other material is an asbestos millboard.

12. The gasket of claim 1 wherein at least one of said gasket elements is removably secured to said web portion with a pressure sensitive adhesive.

* * * * *